(12) United States Patent
Shankar et al.

(10) Patent No.: US 10,091,170 B2
(45) Date of Patent: Oct. 2, 2018

(54) METHOD AND APPARATUS FOR DISTRIBUTING ENCRYPTION AND DECRYPTION PROCESSES BETWEEN NETWORK DEVICES

(71) Applicant: CISCO TECHNOLOGY, INC., San Jose, CA (US)

(72) Inventors: Hari Shankar, San Jose, CA (US); Jin Teng, Sunnyvale, CA (US); Venkatesh Narsipur Gautam, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 226 days.

(21) Appl. No.: 15/086,961

(22) Filed: Mar. 31, 2016

(65) Prior Publication Data

US 2017/0289104 A1   Oct. 5, 2017

(51) Int. Cl.
*H04L 29/06* (2006.01)

(52) U.S. Cl.
CPC ........ *H04L 63/029* (2013.01); *H04L 63/0272* (2013.01); *H04L 63/0464* (2013.01); *H04L 63/062* (2013.01); *H04L 63/166* (2013.01)

(58) Field of Classification Search
None
See application file for complete search history.

(56) References Cited

U.S. PATENT DOCUMENTS

| | | | |
|---|---|---|---|
| 8,190,875 B2 | 5/2012 | Lev Ran et al. | |
| 8,214,635 B2 | 7/2012 | Wang et al. | |
| 8,583,914 B2 | 11/2013 | Lev Ran et al. | |
| 8,856,910 B1 * | 10/2014 | Rostami-Hesarsorkh | H04L 63/1408 713/153 |
| 9,124,628 B2 | 9/2015 | Shankar et al. | |
| 9,300,629 B1 * | 3/2016 | Jahr | H04L 63/02 |
| 9,319,913 B2 * | 4/2016 | Raleigh | H04L 41/0893 |
| 9,590,979 B2 * | 3/2017 | Jahr | H04L 63/02 |
| 9,608,795 B2 * | 3/2017 | Park | H04L 5/0073 |
| 2003/0126468 A1 | 7/2003 | Markham | |
| 2015/0288719 A1 * | 10/2015 | Freudiger | H04L 63/20 726/12 |
| 2015/0381584 A1 | 12/2015 | Martini | |
| 2017/0302703 A1 * | 10/2017 | Buruganahalli | H04L 63/20 |
| 2017/0325113 A1 * | 11/2017 | Markopoulou | H04W 24/08 |
| 2017/0339130 A1 * | 11/2017 | Reddy | H04L 63/0823 |
| 2017/0366433 A1 * | 12/2017 | Raleigh | H04W 4/24 |
| 2017/0374043 A1 * | 12/2017 | Golshan | H04L 63/0471 |

* cited by examiner

*Primary Examiner* — Christopher Revak
(74) *Attorney, Agent, or Firm* — Cindy Kaplan

(57) ABSTRACT

In one embodiment, a method includes establishing at a security device, a secure session for transmitting data between a client device and an end host, receiving decrypted data at the security device from the client device, inspecting the decrypted data at the security device, encrypting the decrypted data at the security device, and transmitting encrypted data to the end host. Decryption at the client device is offloaded from the security device to distribute decryption and encryption processes between the client device and the security device. An apparatus and logic are also disclosed herein.

20 Claims, 9 Drawing Sheets

METHOD AND APPARATUS FOR DISTRIBUTING ENCRYPTION AND DECRYPTION PROCESSES BETWEEN NETWORK DEVICES

TECHNICAL FIELD

The present disclosure relates generally to communication networks, and more particularly, to encryption and decryption for network security protocols.

BACKGROUND

Network security devices such as firewalls provide advanced security by inspecting network traffic flowing through the network security devices. Inspection of encrypted traffic is a challenge for security devices due to the large overhead required to perform a full encryption and decryption for any encrypted traffic that the security device inspects.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
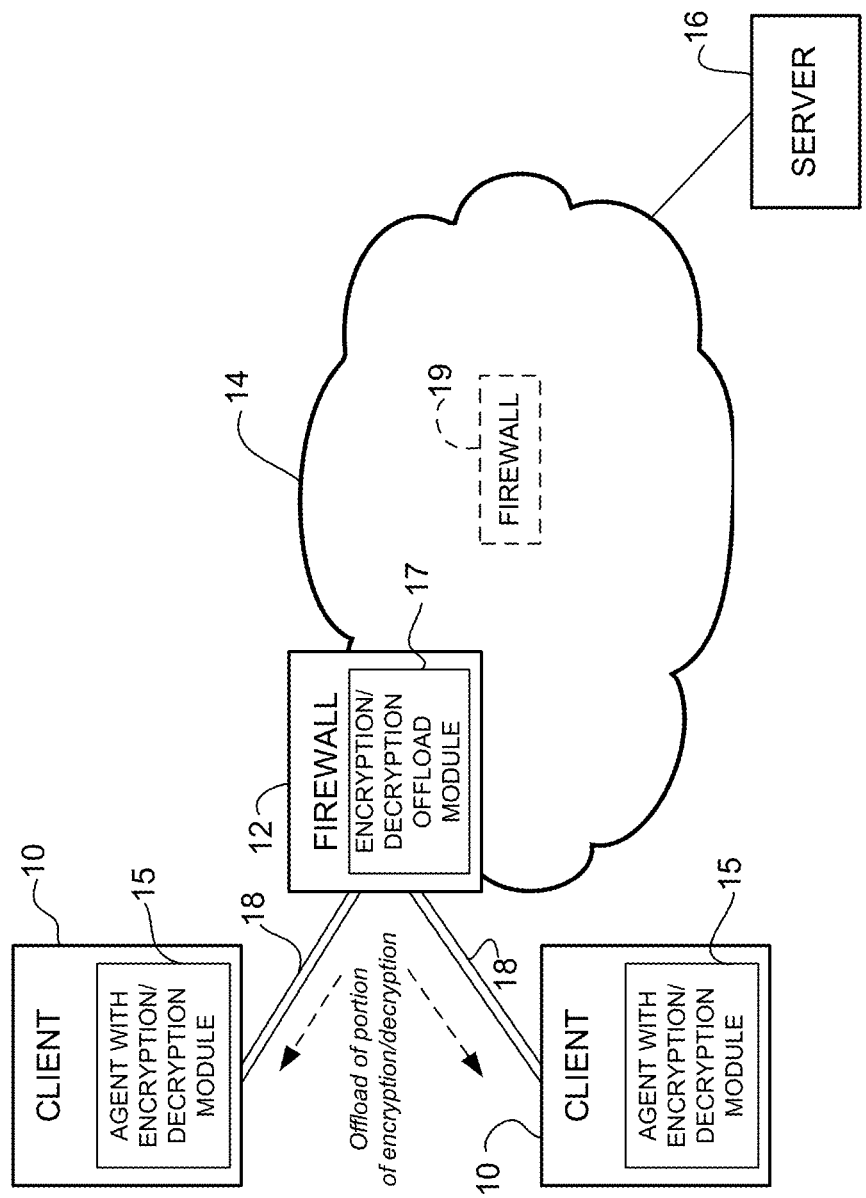
FIG. 1 illustrates an example of a network in which embodiments described herein may be implemented.

In one embodiment, a method generally comprises establishing at a security device, a secure session for transmitting data between a client device and an end host, receiving decrypted data at the security device from the client device, inspecting the decrypted data at the security device, encrypting the decrypted data at the security device, and transmitting encrypted data to the end host. Decryption at the client device is offloaded from the security device to distribute decryption and encryption processes between the client device and the security device.

In another embodiment, an apparatus generally comprises an interface for transmitting decrypted data from a security device to a client device in a secure session established for communication between an end host and the client device, a processor for decrypting data received from the end host, inspecting the decrypted data, and transmitting the decrypted to the client device for encryption at the client device, and memory for storing a session key used for decryption at the security device and encryption at the client device. Encryption at the client device is offloaded from the security device to distribute encryption and decryption processes between the client device and the security device.

In yet another embodiment, logic is encoded on one or more non-transitory computer readable media for execution and when executed operable to process instructions at a client device to offload a decryption process and an encryption process from a security device configured to inspect traffic transmitted between the client device and an end host, decrypt data received at an agent installed at the client device and forward the decrypted data to the security device, encrypt data received from the security device at the agent and forward to a client application installed at the client device. The decryption and encryption processes are offloaded from the security device to distribute decryption and encryption processes between the client device and the security device.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Security devices such as firewalls are used to protect networks through inspection and detection of protocol and networking anomalies, and enforcement of security policies, such as access control. The security device may be configured, for example, to operate as a Transport Layer Security (TLS) (or other similar protocol) proxy by intercepting network traffic flows between clients and servers. The TLS proxy establishes a first secure connection between a client and the proxy, and a second secure connection between the proxy and server. The TLS proxy can then receive encrypted communications from the client over the first secure connection and decrypt the communication for examination at the proxy. In this example, when a client wants to send an outbound packet, it encrypts the packet and sends it to the firewall. The firewall decrypts the packet, inspects it, and if it is determined that the traffic should be forwarded to the server, the firewall re-encrypts the packet according to the second secure connection and sends it to the server over the second secure connection. The opposite process is performed when encrypted traffic is received from the server over the second secure connection. The traffic is decrypted at the proxy, inspected, re-encrypted, and sent to the client over the first secure connection. The extra set of encryption and decryption for encrypted traffic inspection on firewalls is very computationally intensive.

The embodiments described herein reduce the encryption/decryption involved with encrypted traffic inspection on security devices through offloading of at least some of the encryption/decryption to a cooperative end host. Since encryption and decryption processes are some of the most computation intensive operations, resource requirements at the security device may be significantly reduced.

Referring now to the drawings, and first to FIG. 1, a simplified network in which embodiments described herein may be implemented is shown. The embodiments operate in the context of a data communication network including multiple network devices. The network may include any number of network devices in communication via any number of nodes (e.g., routers, switches, gateways, controllers, access devices, aggregation devices, core nodes, intermediate nodes, or other network devices), which facilitate passage of data within the network. The nodes may communicate over one or more networks (e.g., local area network (LAN), metropolitan area network (MAN), wide area network (WAN), virtual private network (VPN), virtual local area network (VLAN), wireless network, enterprise network, corporate network, Internet, intranet, radio access network, public switched network, or any other network).

The network shown in the example of FIG. 1 includes a plurality of client devices (clients, hosts, end hosts, endpoints, stations) 10 in communication with a security device (firewall, security appliance, gateway) 12 located at an edge of a network 14. In one example, the clients 10 may be connected to an enterprise or corporate network through a VPN (Virtual Private Network). The firewall 12 may also be in communication with one or more servers (hosts, end hosts, endpoints) 16, or other network devices, or networks (not shown). The firewall 12 may communicate with any number of clients 10 and servers 16 via any number or type of network devices (e.g., router, switch, and the like). The firewall 12 operates as a perimeter firewall as shown in the example of FIG. 1, but may also operate in the network core (as shown by firewall 19). The firewall 12 may also communicate with one or more other firewalls (e.g., firewall 19) within the network 14 or another network. One or more of the network devices (e.g., firewall 12) may also operate within a cloud or fog environment.

The client device 10 may comprise, for example, a desktop computer, laptop computer, mobile phone, tablet, personal digital assistant, or any other network device in communication with the firewall 12 or network 14. The client device 10 may be a managed or unmanaged device. For example, a user may attempt to access the network from a corporate-managed personal computer, personal network-accessible device, or public terminal. The client 10 may be a wired device or wireless device, or configured for both wired communication (e.g., connected to a docking station) and wireless communication. As described further below, the client 10 comprises an agent with a decryption/encryption module 15 configured to take part in the encryption and decryption processes needed for the firewall 12 to inspect encrypted traffic.

The security device 12 may be any firewall, NGFW (Next Generation Firewall), ASA (Adaptive Security Appliance), proxy device, or other network device positioned in the network to perform firewall functions (e.g., traffic inspection, policy application, filtering, etc.). It is to be understood that these are only examples and other types of network devices may be used. The firewall 12 may comprise an appliance, server, or any other physical network device or virtual network element. In certain embodiments, the firewall 12 is located on a network edge and serves as a focal point for outbound or inbound network traffic (e.g., IP (Internet Protocol) data packets) flowing between the clients 10 and the network 14, and from the network to the clients. As noted above, the firewall may also be located within a core of the network 14 and communicate with other firewalls. For example, the firewall 12 may comprise a distributed group of physical or virtual firewalls.

As shown in FIG. 1, tunnels 18 are located between the clients 10 and firewall 12. The tunnel 18 may comprise any number or combination of wired or wireless network links or connections. The tunnel 18 may be a secure tunnel protected by an encryption algorithm or a network administrator may just pass plain text in the tunnel if the network segment is already secure (e.g., client 10 inside corporate network). The tunnel 18 may be secured by any suitable means. For example, VPN data may be tunneled from the client 10 to the security device 12 and encrypted in the tunnel. In conventional systems, if the client 10 uses a VPN to visit an HTTPS (Hypertext Transfer Protocol Secure) website, the HTTPS data would be doubly encrypted in the secure tunnel. As described in detail below, the embodiments remove the extra encryption when the data is in a secure VPN tunnel, and thereby reduce the cryptographic overhead on the firewall 12.

In one example, the firewall 12 is configured to provide Transport Layer Security (TLS) by intercepting network traffic flows between the clients 10 and server 16. As described in detail below, one or more secure connections may be established along the communication path between the client 10 and server 16 to establish a secure session for transmitting TLS encrypted data from a client application to the server 16 and vice versa. Due to certain rules, such as privacy laws, decryption of some traffic, such as online banking transactions, may not be permitted at the firewall 12. In this case, communications between the client 10 and server 16 are not decrypted or inspected, as illustrated in alternate communication sessions in FIGS. 7, 8, and 9.

It is to be understood that TLS is only one example of a protocol that may be used for secure communication between the client 10 and server 16 and that the embodiments described herein may be used with traffic encrypted according to any protocol (e.g., SSH (Secure Shell) or other protocol) or encryption algorithm, without departing from the scope of the embodiments.

In one embodiment, the firewall 12 collaborates with the client device 10 to reduce the encryption/decryption overhead at the firewall. The client 10 may take part in one or more of the encryption or decryption processes needed for the firewall to inspect encrypted traffic. As shown in FIG. 1, the firewall 12 may include an encryption/decryption offload module 17 (e.g., code, logic, software, firmware) operable to offload encryption/decryption processes from the firewall 12 to the client 10. The agent 15 installed at the client 10 may perform the offloaded functions. For example, the agent 15 may decrypt data prior to forwarding the data to the firewall 12 or encrypt traffic received from the firewall.

The agent 15 may comprise, for example, VPN software such as Cisco AnyConnect, or any other suitable software, firmware, code, logic, or mechanism. Installation of the cooperative agent 15 onto the local host 10 may require a high privilege (e.g., root privilege on local host). In this case, the embodiments may be implemented in a controlled networking environment such as a corporate network. Users may also voluntarily install the agent 15 through piggybacking of the agent on existing networking service software, such as a VPN client (e.g., Cisco AnyConnect or similar software).

The firewall 12 may offload all decryption (for outbound traffic) and re-encryption (for inbound traffic) to the client 10 or offload a portion of the decryption or encryption processes based on resource availability or capability at the client or firewall. For example, encryption or decryption may be offloaded from the firewall 12 to the client 10 for only certain classes or types of traffic, hosts, or flows, or offloaded only when the firewall 12 is overloaded. Since encryption and decryption processes are still performed at the firewall for traffic transmitted to or from the server 16, only a portion of the total encryption/decryption processing at the firewall is offloaded to the client 10. In one embodiment, the firewall 12 offloads half of the encryption/decryption processes (e.g., decryption for outbound traffic/encryption for inbound traffic). The firewall 12 may also offload only decryption or encryption, for example. The offloading of encryption/decryption processes may be set by a network administrator, set by default, or dynamically set at the firewall 12 or client 10 based on resource availability, or collaboration or negotiation between the firewall and client device.

It may be noted that the term "outbound" as used herein refers to traffic from the client 10 to the server 16, whereas the term "inbound" refers to traffic from the server to the client. For example, traffic transmitted from the client (source) 10 to the server (destination) 16 is referred to as outbound traffic, and traffic transmitted from the server (source) 16 to the client (destination) 10 is referred to as inbound traffic. It is to be understood that these terms are used for ease of description and other terms (or relative directions of traffic) may be used without departing from the scope of the embodiments.

The server 16 may comprise any host (e.g., end host, outside host) or network device operable to receive and decrypt encrypted traffic, and encrypt and transmit traffic.

The client 10, firewall 12, and server 16 may comprise software, logic, code, module, or other mechanism operable to decrypt or encrypt traffic using any suitable encryption/decryption algorithms or processes.

It is to be understood that the network devices and topology shown in FIG. 1 and described above is only an example and the embodiments described herein may be implemented in networks comprising different network topologies or network devices, or using different protocols, without departing from the scope of the embodiments. For example, the network may include any number or type of network devices that facilitate passage of data over the network (e.g., routers, switches, gateways, controllers, appliances), network elements that operate as endpoints or hosts (e.g., servers, virtual machines, clients), and any number of network sites or domains in communication with any number of networks. Thus, network nodes may be used in any suitable network topology, which may include any number of servers, virtual machines, switches, routers, appliances, controllers, or other nodes interconnected to form a large and complex network, which may include cloud or fog computing. Nodes may be coupled to other nodes or networks through one or more interfaces employing any suitable wired or wireless connection, which provides a viable pathway for electronic communications.

Figure 2:
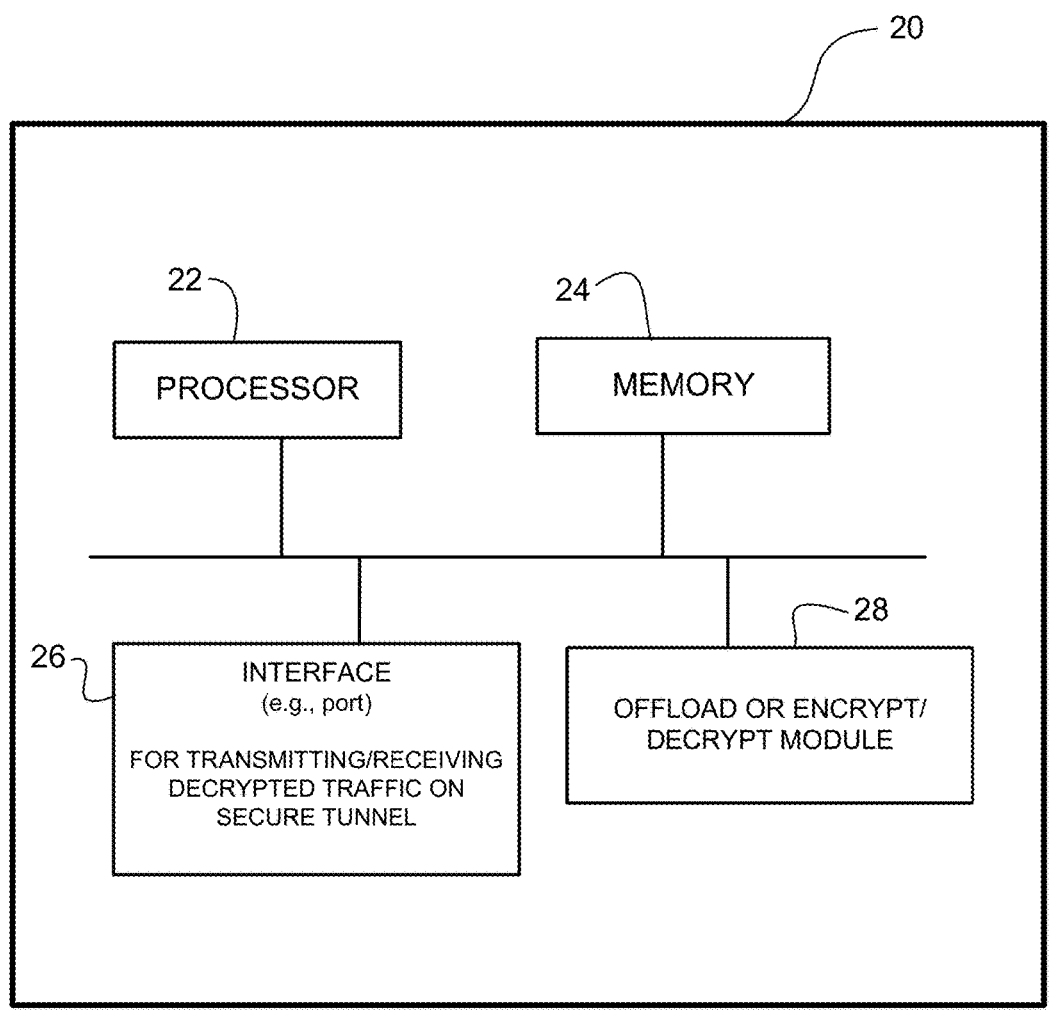
FIG. 2 depicts an example of a network device useful in implementing embodiments described herein.

FIG. 2 illustrates an example of a network device 20 (e.g., host (client device) 10, security device (firewall) 12 in FIG. 1) that may be used to implement the embodiments described herein. In one embodiment, the network device 20 is a programmable machine that may be implemented in hardware, software, or any combination thereof. The network device 20 includes one or more processor 22, memory 24, network interface 26, and module 28 (e.g., encryption/decryption module at client 10, encryption/decryption offload module at firewall 12).

Memory 24 may be a volatile memory or non-volatile storage, which stores various applications, operating systems, modules, and data for execution and use by the processor 22. One or more of the offload module or encryption/decryption module components (e.g., code, logic, software, etc.) may be stored in memory 24. The network device 20 may include any number of memory components.

Logic may be encoded in one or more tangible media for execution by the processor 22. The processor 22 may be configured to implement one or more of the functions described herein. For example, the processor 22 may execute codes stored in a computer-readable medium such as memory 24 to perform processes described below with respect to FIG. 4A, 4B, 6A, or 6B. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The network device 20 may include any number of processors 22.

The network interface 26 may comprise any number of interfaces (linecards, ports) for receiving data or transmitting data to other devices. As shown in FIG. 1, the interface provides for communication between the client 10 and firewall 12 over the secure tunnel 18. The interface 26 may, for example, transmit or receive decrypted traffic on the secure tunnel 18 or communications regarding the offloading of encryption/decryption processes. The network interface 26 may include, for example, an Ethernet interface for connection to a computer or network. The network interface 26 may be configured to transmit or receive data using a variety of different communication protocols. The interface 26 may include mechanical, electrical, and signaling circuitry for communicating data over physical links coupled to the network. As noted above, the client 10 may comprise an interface configured for wireless communication with the network.

It is to be understood that the network device 20 shown in FIG. 2 and described above is only an example and that different configurations of network devices may be used. For example, the network device 20 may further include any suitable combination of hardware, software, algorithms, processors, devices, components, modules, or elements operable to facilitate the capabilities described herein.

Figure 3:
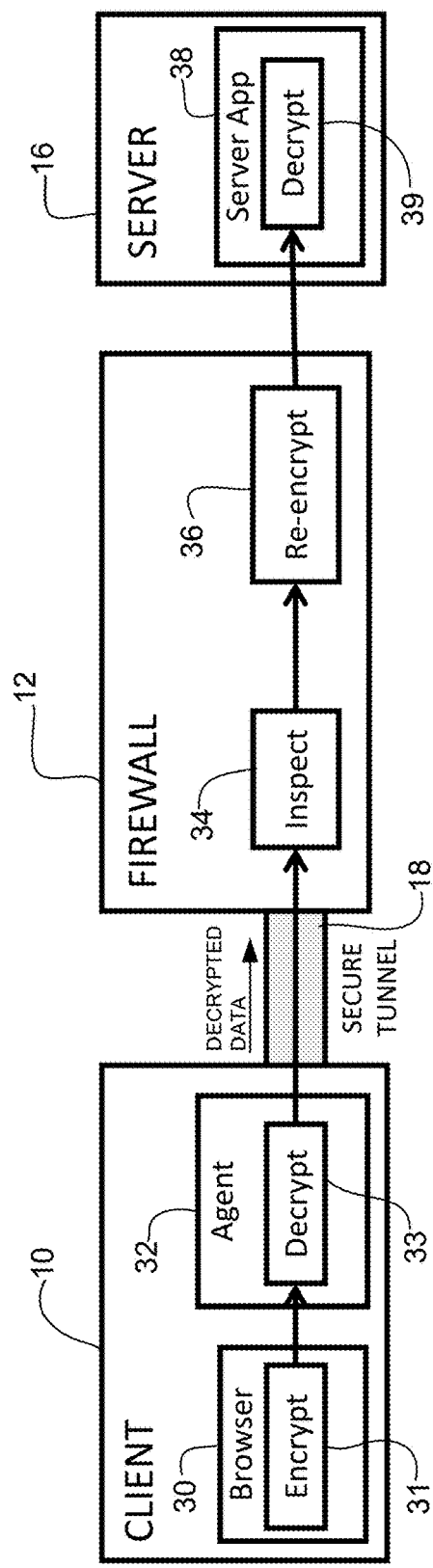
FIG. 3 illustrates encryption and decryption processes performed at the network devices shown in the network of FIG. 1 for outbound traffic, in accordance with one embodiment.

FIG. 3 illustrates transmission and processing of outbound traffic (i.e., from client 10 to server 16) between the components shown in the network of FIG. 1, in accordance with one embodiment. The client device 10 includes a client application (browser) 30 and agent 32. The browser 30 encrypts outgoing data (packet, frame, traffic) (as shown at block 31) and transmits the data to agent 32, which is also installed and running at the client 10. As previously described, the agent 32 may comprise a VPN client such as AnyConnect or any other client software or module. In this example, the firewall 12 has offloaded decryption of outbound data to the client agent 32. The agent 32 decrypts data received from the browser 30 (at block 33) and forwards the decrypted data through the secure tunnel 18 to the firewall 12 for inspection (34). If after inspection of the data, the firewall 12 decides that the traffic should be forwarded, it re-encrypts the data (36) and forwards the data to outside host (server) 16. The server 16 may include a server application 38 (e.g., software, code, logic) operable to decrypt (39) received data.

Figure 4A:
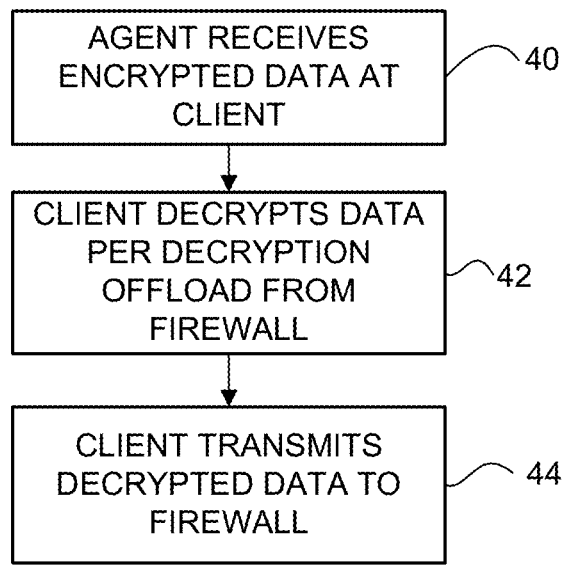
FIGS. 4A and 4B are flowcharts illustrating an overview of a process for offloading a decryption process from a firewall to a client for the outbound traffic shown in FIG. 3, in accordance with one embodiment.
Figure 4B:
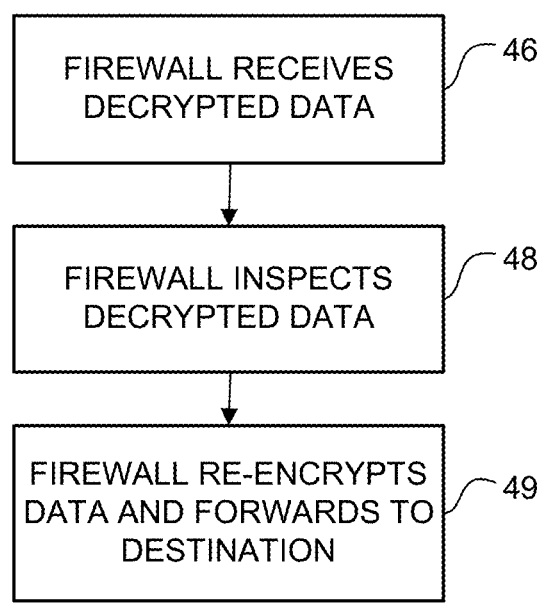

FIGS. 4A and 4B are flowcharts illustrating an overview of the process shown in FIG. 3, in which a decryption process for outbound traffic is offloaded from the security device (firewall) 12 to the client 10, in accordance with one embodiment. As previously described, instructions for offloading encryption, decryption, or both encryption and decryption from the firewall 12 to the client device 10 may be generated by the firewall 12 or a network administrator. FIG. 4A describes a process performed at the client 10 and FIG. 4B describes a process performed at the firewall 12.

At step 40, the agent 32 at the client device 10 receives encrypted data from the browser 30 (FIGS. 3 and 4A). The client agent 32 decrypts the data (step 42) and transmits the decrypted data to the firewall 12 (step 44). The traffic is destined for the server 16 and may be intercepted by the firewall 12 for inspection.

At step 46, the firewall 12 receives the decrypted data from the client 10 (FIGS. 3 and 4B). The firewall 12 inspects the decrypted traffic (step 48) and if the firewall decides that the data should be forwarded to its destination (e.g., based on policies, security checks, ACLs (Access Control Lists), etc.), the firewall re-encrypts the data and forwards it to its destination (server 16) (step 49).

Figure 5:
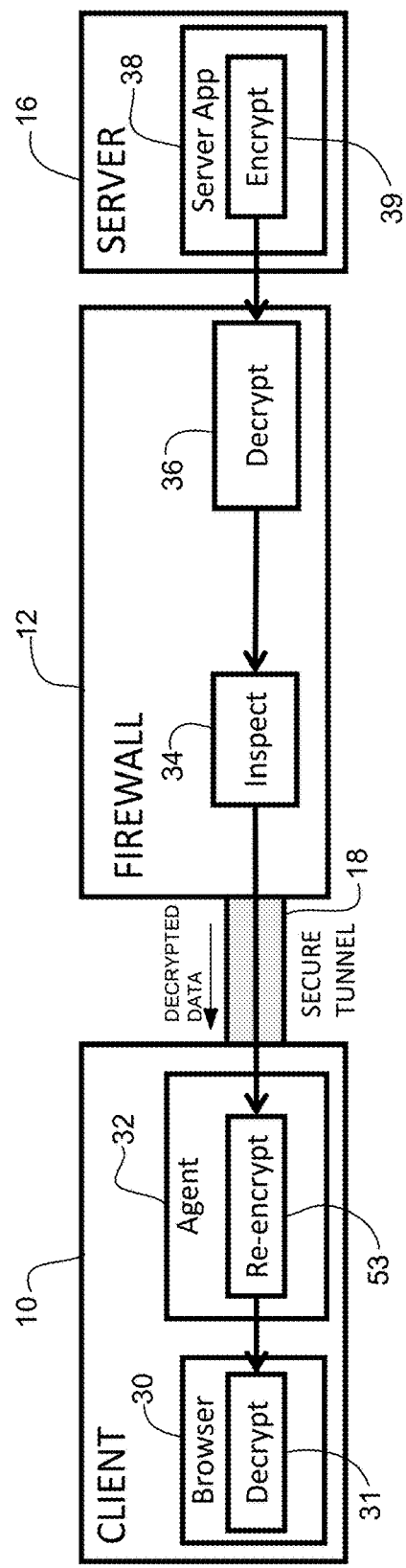
FIG. 5 illustrates encryption and decryption processes performed at the network devices shown in the network of FIG. 1 for inbound traffic, in accordance with one embodiment.

FIG. 5 illustrates transmission of traffic from the server 16 to the client 10 (i.e., inbound direction). Traffic destined for the client 10 is encrypted at the server 16 (as indicated at block 39). The data is decrypted (36) and inspected (34) at the firewall 12. If after inspection, the firewall 12 decides to forward the data, it transmits the decrypted data over the secure tunnel 18. The traffic is encrypted (re-encrypted) (53) at the client agent 32 and transmitted to the browser 30, where it is decrypted (31).

Figure 6A:
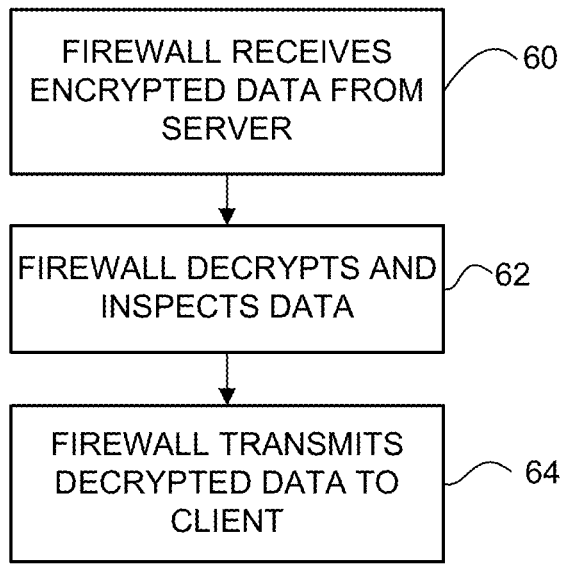
FIGS. 6A and 6B are flowcharts illustrating an overview of a process for offloading an encryption process from the firewall to the client for the inbound traffic shown in FIG. 5, in accordance with one embodiment.
Figure 6B:
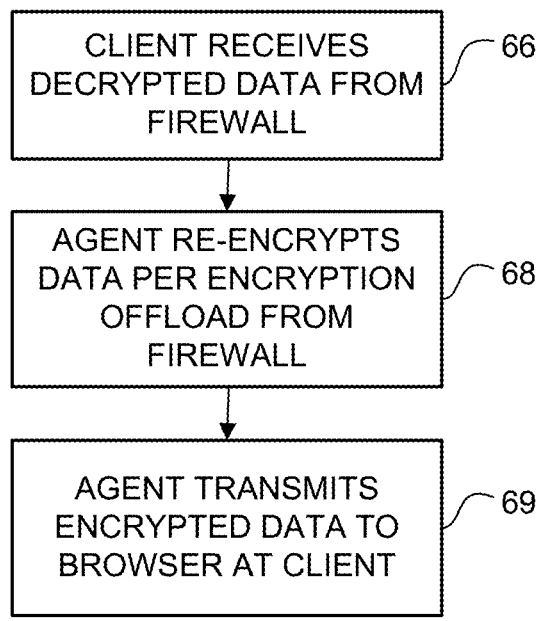

FIGS. 6A and 6B are flowcharts illustrating an overview of a process for offloading an encryption process from the firewall 12 to the client 10 for inbound traffic, in accordance with one embodiment. FIG. 6A describes a process performed at the firewall 12 and FIG. 6B describes a process performed at the client 10.

At step 60, the firewall 12 receives encrypted data from the server 16 (FIGS. 5 and 6A). The firewall 12 decrypts and inspects the data (step 62). If the firewall 12 determines that the data should be forwarded, it transmits the decrypted data to the client 10 (step 64).

The client 10 receives the decrypted data at step 66 (FIGS. 5 and 6B). The client agent 32 encrypts (re-encrypts) the data (step 68) and transmits the encrypted data to the browser at the client (step 69).

It is to be understood that the processes shown in FIGS. 4A, 4B, 6A, and 6B and described above are only examples and that steps may be added, combined, or modified without departing from the scope of the embodiments.

Figure 7:
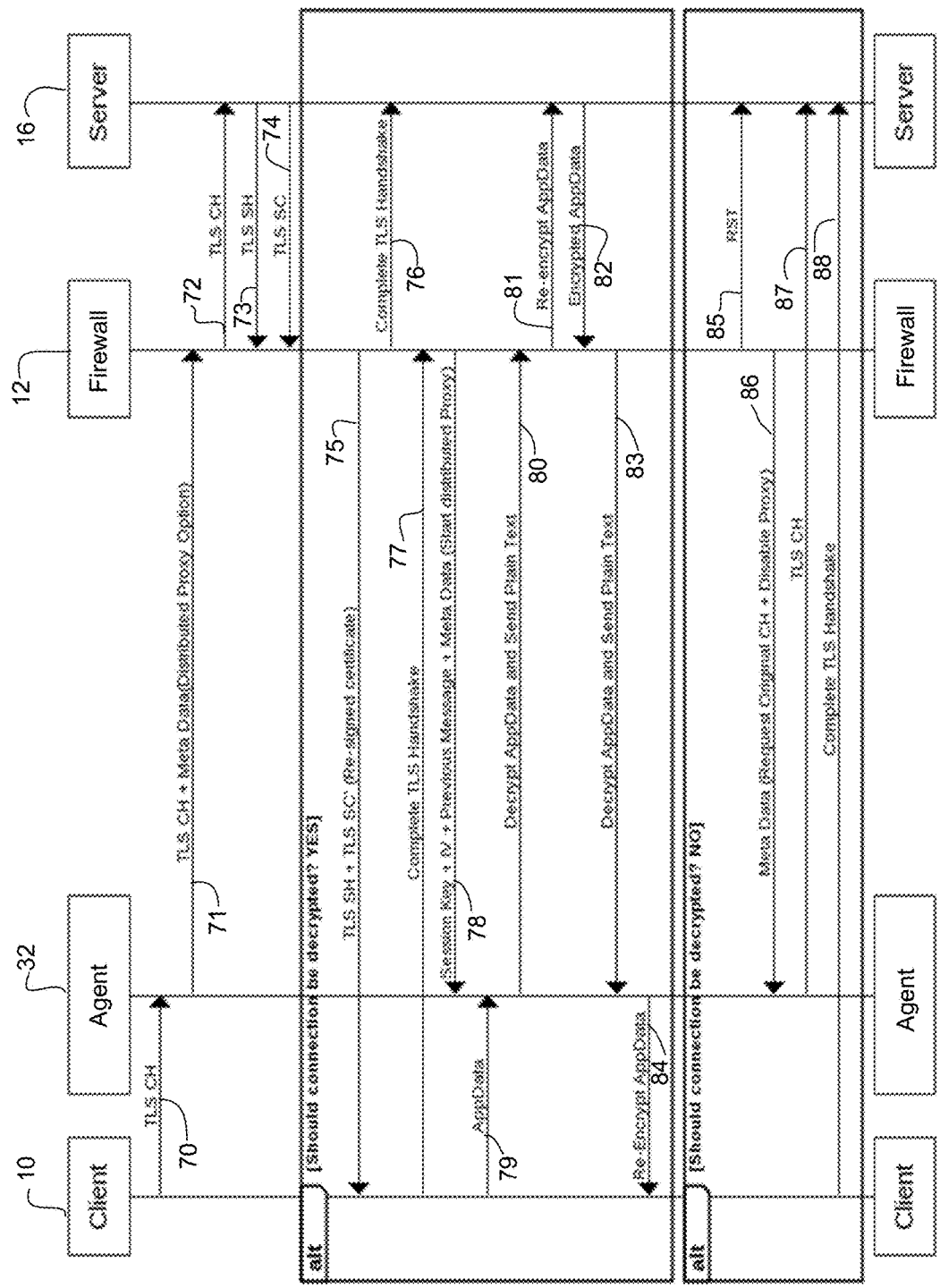
FIG. 7 illustrates a process flow for session key sharing from the firewall for secure session establishment, in accordance with one embodiment.
Figure 8:
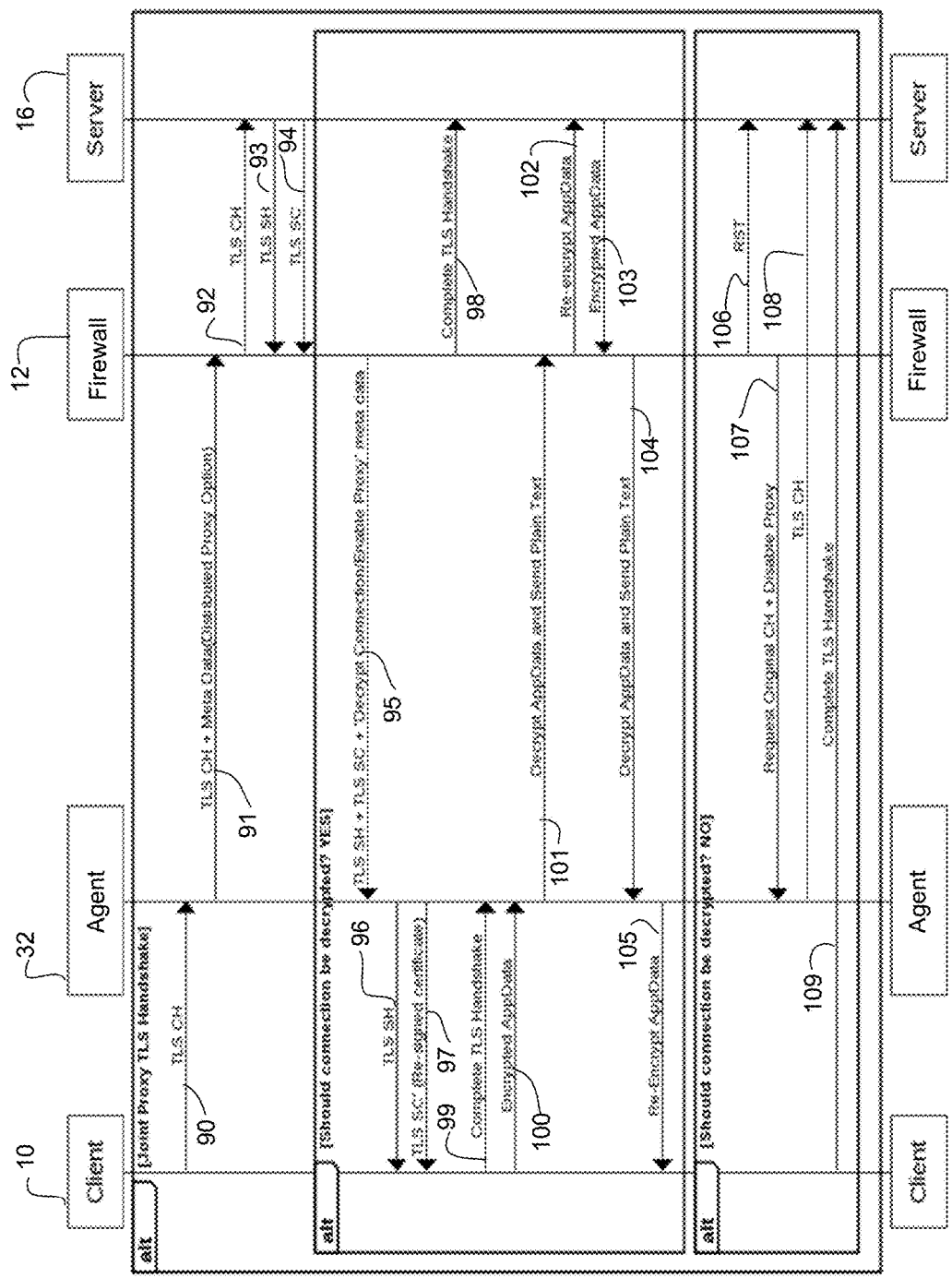
FIG. 8 illustrates a process flow for a joint proxy for secure session establishment, in accordance with one embodiment.
Figure 9:
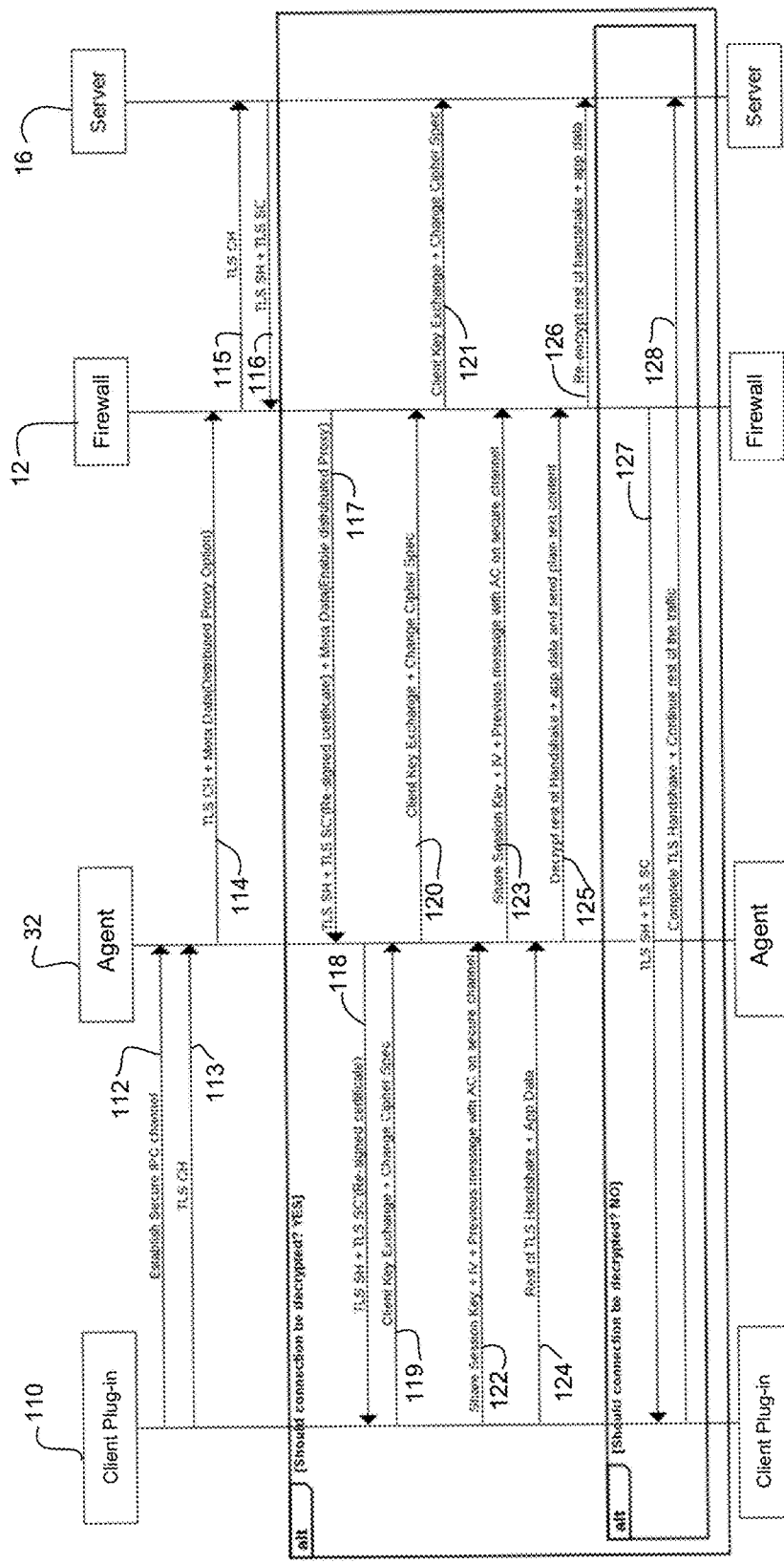
FIG. 9 illustrates a process flow for local key/secret sharing through a client plug-in for secure session establishment, in accordance with one embodiment.

The following describes establishment of a secure session for transmitting data between the client 10 and server 16. More specifically, the following examples describe secure sessions that may be established between the client application 30 (client 10), agent 32, firewall 12, and server 16 (FIGS. 7, 8, and 9). The term "secure session" as used herein may refer to one or more communication sessions between components within the communication path that allow for communication between the client 10 and server 16. As previously described, one or more segments of the communication path (e.g., path between client device 10 and firewall 12) may be located within a secure environment (e.g., inside corporate network) or protected within another secure session, which allows for the transmission of decrypted data (plain text) within that segment. Thus, the term "secure session" may refer to a communication session comprising one or more sessions that are protected by other means (e.g., plain text transmitted within a secure tunnel). The following examples utilize TLS, however, as previously described, the embodiments may be implemented with other protocols.

There may be considerable cryptographic overhead in session establishment due to key negotiation algorithms and certificate examination. For short-lived sessions, reducing overhead in secure session establishment is important, as the establishment phase constitutes a significantly large portion of the entire session. In the following examples, the cryptographic overhead is attempted to be reduced in the establishment phase.

In one embodiment, session key sharing from the firewall is used. With this scheme, the firewall 12 runs all of the conventional TLS proxy setup process until session keys (e.g., master keys in TLS terminology) are generated and the client 10 and server 16 are ready to send data. At this point, the firewall 12 may share all necessary information, including the keys, with the agent 32. The agent 32 is then able to encrypt or decrypt data for the firewall 12. Any suitable protocol may be used for communication between the agent 32 and the firewall 12 to indicate that the agent has received the key and will encrypt/decrypt data for the firewall.

Referring now to FIG. 7, a process flow for session key sharing from the firewall 12 is shown. As shown in FIG. 7 and described below, the firewall 12 finishes the TLS handshake process with the server 16 and then shares the session keys with the agent 32. As indicated at 70, the client (e.g., client application, browser) 10 first sends a TLS client hello (CH) to the agent 32. The agent 32 then sends a TLS client hello and meta data (e.g., distributed proxy option) to the firewall 12 (71). The firewall 12 and server exchange TLS client hello (CH) (72), server hello (SH) (73), and service certificate (SC) (74). The firewall 12 can then transmit the server hello and a re-signed certificate to the client 10 (75). The firewall 12 completes the TLS handshake with the server 16 (76) and the client completes the TLS handshake with the firewall 12 (77). The firewall 12 shares the session key (along with previous message and meta data) with the agent (78). The client 10 transmits application data to the agent 32 (79) and the agent decrypts the application data and transmits plain text to the firewall 12 (80) (as previously described). After inspection, the application data is re-encrypted at the firewall and transmitted to the server 16 (81). In the return direction, encrypted application data is transmitted from the server 16 to the firewall 12 (82). The firewall 12 decrypts and inspects the data, and sends plain text to the agent 32 (83), as previously described. The agent 32 re-encrypts the application data and transmits it to the client (browser) (84).

As previously noted, there may be certain types of data that should not be decrypted or inspected by the firewall. In this case, a connection reset is transmitted (85) from the firewall 12 to the server 16 (following step 74), as shown in alternate communication flow following the exchange of hellos between firewall 12 and server 16. The firewall 12 sends meta data (request original client hello and disable proxy) to the agent 32 (86). The agent 32 sends a TLS client hello to the server 16 (87) and the client 10 completes the TLS handshake directly with the server 16 (88).

It is to be understood that the session key sharing process described above and shown in FIG. 7 is only an example and other sharing processes may be performed. For example, session key sharing may be performed whenever a session key is sharable with an external device. Handshakes other than shown in FIG. 7 and described above may be used, without departing from the scope of the embodiments. For example, any scenario in the handshake where the session keys are sharable and the encryption/decryption steps can be accurately performed may be used.

In another embodiment, the agent 32 and firewall 12 form a joint proxy. The agent 32 establishes one segment of the TLS session with the application on the inside host and the firewall 12 establishes the other segment with the outside host 16. The data is tunneled between the agent 32 and the firewall 12. With use of the joint proxy, one drawback is that the inside host needs to trust both the agent 32 and the firewall 12 as TLS certificate signers. A gain is provided since almost half of the TLS handshake process is offloaded to the end host 10. This may be a big performance gain for the firewall 12.

FIG. 8 illustrates an example of communication flow for the joint proxy process. As noted above, the agent 32 forms a TLS session with the client application at client 10 and the firewall 12 forms the other TLS session with the server 16. As shown at 90 in FIG. 8, the client 10 first sends a TLS client hello to the agent 32. The agent 32 transmits a TLS client hello and meta data to the firewall 12 (91). The firewall 12 and server 16 exchange TLS client hello (92), TLS server hello (93), and TLS service certificate (94). The firewall 12 then sends the server hello, TLS service certificate, and decrypt connection/enable proxy meta data to the agent 32 (95). The agent 32 transmits the server hello to the client application 10 (96) and the TLS re-signed service certificate (97). The client 10 completes the TLS handshake with the agent 32 (97) and the firewall 12 completes the TLS handshake with the server 16 (98). The client application 10 sends encrypted application data to the agent 32 (100) and the agent decrypts the application data and sends plain text to the firewall 12 (101), as previously described. After inspection, the firewall 12 re-encrypts the application data and transmits it to the server 16 (102). On the return path, the server 16 transmits encrypted application data to the firewall 12 (103). The firewall 12 decrypts and inspects the application data and sends plain text to the agent 32 (104). The agent 32 re-encrypts the application data and transmits it to the client application 10 (105).

As described above with respect to FIG. 7, certain data should not be decrypted and inspected by the firewall. In this case, the TLS connection is between the agent 32 and server 16 (106, 107, 108, 109), as previously described.

In another embodiment, local key/secret sharing is performed through use of a plug-in 110 at the client 10. The plug-in 110 may be installed, for example, into an application such as the browser. Whenever a TLS session needs to be set up, the plug-in shares the keys or essential secrets leading to the keys (e.g., local random numbers in the Diffie-Hellman algorithm) with the agent 32. The agent 32 can then share this information with the firewall 12. With this information, both the agent 32 and the firewall 12 may perform a legitimate Man-in-the-Middle inspection. In this way, the inspection is transparent to upper layer applications and this practice obviates the need to trust the firewall 12 or the agent 32 as a certificate signer.

FIG. 9 illustrates a process flow for the local key/secret sharing through plug-ins. The client plug-in 110 establishes a secure IPC (Inter-Process Communication) channel with the agent 32 (112) and sends a TLS client hello to the agent 32 (113). The agent 32 transmits the TLS client hello and meta data to the firewall 12 (114). The firewall 12 and server 16 exchange TLS client hello (115) and TLS server hello and TLS service certificate (116). The firewall 12 then transmits the TLS server hello and TLS re-signed service certificate along with meta data to the agent 32 (117). The agent 32 forwards the TLS server hello and TLS re-signed service certificate to the client plug-in 110 (118). The plug-in 110 exchanges client key with the agent 32 and changes cipher spec (119). The agent 32 then exchanges a client key with the firewall 12 and changes the cipher spec (120). The firewall 12 exchanges the client key with the server 16 and changes the cipher spec (121). The plug-in 110 also shares the session key and previous message on a secure channel with the agent 32 (122). The agent 32 shares the session key and previous message on the secure channel with the firewall 12 (123). The plug-in 110 performs the rest of the TLS handshake and sends application data to the agent (step 124). The agent 32 decrypts the rest of the handshake and application data and sends plain text content to the firewall 12 (125). The firewall inspects and re-encrypts the rest of the handshake and application data and transmits to the server 16 (126).

As previously described, certain data should not be decrypted, in which case steps 127 and 128 are performed in place of steps 117-126.

As can be observed from the foregoing, the embodiments described herein allow for removal of duplicate encryption within a secure tunnel. The embodiments thus work well with off-premise users that connect to an on-premise firewall via a tunnel such as VPN. The embodiments also benefit on-premise users that may not use VPN to connect to an on-premise firewall because they are already in the same sub-net and on the inside of the firewall. When the user visits TLS enabled websites, the user may open a VPN tunnel and tunnel the TLS related data therethrough. The user only needs to open the tunnel once for all TLS sessions. The VPN tunnel may use a less expensive encryption algorithm than TLS to ensure its own security. This may be acceptable because it is normally less risky inside a corporate network and there is no need for the high level of security provided by TLS. For example, if a network administrator thinks that it is safe, the VPN tunnel may simply send plain text messages onto the wire. With a less expensive tunnel than TLS and a persistent VPN to tunnel all TLS data, the cryptographic load on the firewall is effectively reduced.

The embodiments described herein allow data to be protected. For example, either encryption is used or the network administrator deems it safe enough to send plain text. If the agent is well protected (e.g., it is made generally tamper-proof), the attacker cannot get useful information from the agent. There is also a possibility that the agent is compromised, however, the agent normally runs at root privilege and compromising the agent implies that the attacker has the root privilege. Even if this happens, the attacker cannot do more with the embodiments described herein than otherwise able.

The above examples describe distribution of TLS operations form a firewall to an end host (client device). The embodiments may also be used to distribute TLS (or other protocol) operations from one firewall to another firewall (e.g., firewall 12 to firewall 19 in FIG. 1). The firewalls may share the encryption and decryption load in inspecting encrypted traffic if they are on the path of the traffic. One example of firewall to firewall TLS offloading is with virtual environments. In a virtual environment, there may be more firewalls than in a physical environment. Multiple virtual firewalls may participate in the TLS proxy operations and one or more firewalls may offload encryption/decryption processes to one or more other firewalls, based on resource availability, for example.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   establishing at a security device, a secure session for transmitting data between a client device and an end host;
   identifying one or more decryption or encryption processes for selected traffic to be offloaded from the security device and performed at the client device;
   receiving decrypted data at the security device from the client device;
   inspecting said decrypted data at the security device;
   encrypting said decrypted data at the security device; and
   transmitting encrypted data to the end host;
   wherein said decryption or encryption process performed for said selected traffic at the client device is offloaded from the security device to distribute decryption and encryption processes between the client device and the security device.

2. The method of claim 1 wherein the security device comprises a firewall operable to intercept traffic transmitted between the client device and the end host.

3. The method of claim 1 wherein receiving said decrypted data comprises receiving said decrypted data on a secure tunnel between the client device and the security device.

4. The method of claim 1 further comprising:
   receiving at the security device, encrypted data from the end host;
   decrypting said encrypted data for inspection at the security device; and
   transmitting decrypted data from the security device to the client device for encryption at the client device;
   wherein said encryption at the client device is offloaded from the security device.

5. The method of claim 1 wherein establishing the secure session comprises establishing one or more Transport Layer Security sessions at the security device.

6. The method of claim 1 wherein establishing the secure session comprises establishing the secure session with the end host and sharing a session key with the client device.

7. The method of claim 1 wherein establishing the secure session comprises establishing a first secure session with the end host, wherein a second secure session is established between a client application and an agent at the client device.

8. The method of claim 1 wherein establishing the secure session comprises receiving a session key from the client device and transmitting said session key to the end host.

9. The method of claim 1 further comprising distributing one or more encryption or decryption processes between the security device and another security device.

10. An apparatus comprising:
    an interface for transmitting decrypted data from a security device to a client device in a secure session established for communication between an end host and the client device;
    a processor for decrypting data received from the end host, inspecting said decrypted data, and transmitting said decrypted data to the client device for encryption at the client device based on an encryption process offloaded from the security device to the client; and
    memory for storing a session key used for decryption at the security device;
    wherein one or more decryption or encryption processes are identified for offloading from the security device to distribute encryption and decryption processes between the client device and the security device.

11. The apparatus of claim 10 wherein the apparatus comprises a firewall operable to intercept traffic transmitted between the client device and the end host.

12. The apparatus of claim 10 wherein the interface is configured for communication with a secure tunnel located between the client device and the security device.

13. The apparatus of claim 10 wherein the processor is further operable to inspect decrypted data received from the client device and decrypted at the client device, re-encrypt said decrypted data and transmit said re-encrypted data to the end host, wherein decryption at the client device is offloaded from the security device.

14. The apparatus of claim 10 wherein the secure session comprises one or more Transport Layer Security sessions.

15. The apparatus of claim 10 wherein the processor is configured to establish the secure session with the end host and share said session key with the client device.

16. The apparatus of claim 10 wherein the secure session comprises a first secure session between the security device and the end host and a second secure session between a client application and an agent at the client device.

17. The apparatus of claim 10 wherein processor is further configured to transmit said session key from the client device to the end host.

18. Logic encoded on one or more non-transitory computer readable media for execution and when executed operable to:
    process instructions at a client device to offload a decryption process and an encryption process from a security device configured to inspect traffic transmitted between the client device and an end host;
    decrypt data received at an agent installed at the client device and forward said decrypted data to the security device; and
    encrypt data received from the security device at the agent and forward said encrypted data to a client application installed at the client device;
    wherein said decryption and encryption processes are offloaded to the client device from the security device to distribute said decryption and encryption processes between the client device and the security device.

19. The logic of claim 18 wherein the agent comprises VPN (Virtual Private Network) software.

20. The logic of claim 18 further operable to share a session key with a plug-in installed at the client application.

* * * * *